US008756611B2

(12) United States Patent
Chacko et al.

(10) Patent No.: US 8,756,611 B2
(45) Date of Patent: Jun. 17, 2014

(54) DELAYED EXPANSION OF VALUES IN CONTEXT

(75) Inventors: Joseph K. Chacko, Sheffield (GB); Tinny M. C. Ng, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/962,612

(22) Filed: Dec. 7, 2010

(65) Prior Publication Data

US 2012/0144398 A1 Jun. 7, 2012

(51) Int. Cl.
*G06F 9/46* (2006.01)

(52) U.S. Cl.
USPC .......................................... 718/106; 719/331

(58) Field of Classification Search
None
See application file for complete search history.

(56) References Cited

U.S. PATENT DOCUMENTS

| | | | | |
|---|---|---|---|---|
| 5,832,505 | A * | 11/1998 | Kasso et al. | 1/1 |
| 6,237,092 | B1 * | 5/2001 | Hayes, Jr. | 713/100 |
| 7,392,247 | B2 * | 6/2008 | Chen et al. | 707/694 |
| 7,464,107 | B2 * | 12/2008 | Gupta et al. | 1/1 |
| 7,506,145 | B2 * | 3/2009 | Zenz et al. | 713/1 |
| 7,552,420 | B1 * | 6/2009 | Smith et al. | 717/121 |
| 7,660,845 | B2 * | 2/2010 | Fusari | 709/203 |
| 7,661,091 | B2 | 2/2010 | Finocchio | |
| 7,865,906 | B2 * | 1/2011 | Peruta | 719/320 |
| 8,272,001 | B2 * | 9/2012 | Della Peruta | 719/328 |
| 2003/0187984 | A1 * | 10/2003 | Banavar et al. | 709/225 |
| 2005/0027584 | A1 * | 2/2005 | Fusari | 705/9 |
| 2005/0039165 | A1 * | 2/2005 | Wolff et al. | 717/114 |
| 2005/0084105 | A1 * | 4/2005 | Fusari et al. | 380/213 |
| 2005/0091655 | A1 * | 4/2005 | Probert et al. | 718/100 |
| 2006/0136409 | A1 * | 6/2006 | Leidig | 707/4 |
| 2007/0124296 | A1 * | 5/2007 | Toebes | 707/5 |
| 2007/0168962 | A1 * | 7/2007 | Heinke et al. | 717/120 |
| 2007/0265814 | A1 * | 11/2007 | Moore et al. | 703/10 |
| 2008/0134147 | A1 * | 6/2008 | McCullough et al. | 717/127 |
| 2008/0235272 | A1 * | 9/2008 | Wang et al. | 707/103 R |
| 2008/0263519 | A1 | 10/2008 | Bognar | |
| 2009/0222921 | A1 * | 9/2009 | Mukhopadhyay et al. | 726/23 |
| 2009/0313367 | A1 * | 12/2009 | Alon et al. | 709/223 |

(Continued)

FOREIGN PATENT DOCUMENTS

CA 2707251 A1 9/2010

OTHER PUBLICATIONS

Author Unknown, System for injecting dependencies between components into a sample application, website/page: http://priorartdatabase.com/IPCOM/000199489, Sep. 6, 2010, pp. 1-5, Disclosure: IPCOM000199489D, IP.com, Published on the World Wide Web.

(Continued)

*Primary Examiner* — Emerson Puente
*Assistant Examiner* — Mehran Kamran
(74) *Attorney, Agent, or Firm* — Lee Law, PLLC; Christopher B. Lee (57) ABSTRACT

Application context changes associated with instantiated applications are monitored at a context tracking device. In response to each application context change, relationship context dependency properties between the instantiated applications and application resources associated with the instantiated applications are evaluated. At least one relationship context dependency property that is used by at least one of the instantiated applications is determined to have changed as a result of an application context change. The at least one relationship context dependency property is updated during runtime based upon the application context change.

14 Claims, 5 Drawing Sheets

(56) References Cited

U.S. PATENT DOCUMENTS

| | | | |
|---|---|---|---|
| 2010/0023934 A1* | 1/2010 | Sheehan et al. | 717/168 |
| 2010/0042922 A1* | 2/2010 | Bradateanu et al. | 715/711 |
| 2010/0333063 A1* | 12/2010 | Malkin et al. | 717/106 |
| 2011/0047611 A1* | 2/2011 | Hayler et al. | 726/12 |
| 2011/0179425 A1* | 7/2011 | Zakon et al. | 719/316 |
| 2011/0271287 A1* | 11/2011 | Fra et al. | 718/108 |
| 2011/0314092 A1* | 12/2011 | Lunt et al. | 709/203 |
| 2012/0066620 A1* | 3/2012 | Teng et al. | 715/762 |
| 2012/0110448 A1* | 5/2012 | Jhoney et al. | 715/704 |
| 2012/0137213 A1* | 5/2012 | Hayler et al. | 715/239 |

OTHER PUBLICATIONS

Author Unknown, System for the decomposition of sample applications into re-usable parts, website/page: http://priorartdatabase.com/IPCOM/000195548, May 4, 2010, pp. 1-5, Disclosure: IPCOM000195548D, IP.com, Published on the World Wide Web.

* cited by examiner

DELAYED EXPANSION OF VALUES IN CONTEXT

BACKGROUND

The present invention relates to property values associated with applications relationships. More particularly, the present invention relates to delayed expansion of values in context.

Values for applications may be defined, for example, using Java® properties. The values so defined are evaluated once when an application is loaded and, as such, are static in nature.

BRIEF SUMMARY

A method includes monitoring, at a context tracking device, application context changes associated with instantiated applications; evaluating, in response to each application context change, relationship context dependency properties between the instantiated applications and application resources associated with the instantiated applications; determining that at least one relationship context dependency property that is used by at least one of the instantiated applications has changed as a result of an application context change; and updating during runtime the at least one relationship context dependency property based upon the application context change.

A system includes a memory; and a processor programmed to: monitor application context changes associated with instantiated applications; evaluate, in response to each application context change, relationship context dependency properties between the instantiated applications and application resources associated with the instantiated applications; determine that at least one relationship context dependency property that is used by at least one of the instantiated applications has changed as a result of an application context change; and update during runtime the at least one relationship context dependency property based upon the application context change.

A computer program product includes a computer readable storage medium including a computer readable program code, where the computer readable program code when executed on a computer causes the computer to monitor application context changes associated with instantiated applications; evaluate, in response to each application context change, relationship context dependency properties between the instantiated applications and application resources associated with the instantiated applications; determine that at least one relationship context dependency property that is used by at least one of the instantiated applications has changed as a result of an application context change; and update during runtime the at least one relationship context dependency property based upon the application context change.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides delayed expansion of values in context. For purposes of the present description, "context" may be referred to as any association or relationship between applications or between applications and application resources that may change over time, such that the association or relationship may be evaluated at different times and have a different resulting value or reference. For example, an application may use and reference a database, and the actual database that is used may change over time. Alternatively, one application may use a database and another application may monitor that database, and the database that is used and monitored may change over time. By use of the present subject matter, that association or relationship between the application(s) and the application resource(s) (e.g., the database) may be changed over time without restarting the application(s). Many other variations on contextual values and relationships are possible and all are considered within the scope of the present subject matter.

The present subject matter allows a set of definitions (e.g., properties) to be loaded as expressions in a programming language. Dynamic definitions/properties (i.e., that depend upon context) may be stored, but may not be evaluated, until a value associated with the property is required. Some referenced variables may be defined during program execution and before the properties are evaluated. These referenced variables make up the context within which properties may be evaluated. This allows the evaluation of the properties to be specific to a context. As such, the present subject matter provides a flexible property definition that may include conditional evaluation, depending on the presence as well as the values of the supplied context. These properties form a template that may be used to determine the required values in a variety of different contexts, within a single program execution without requiring an application to be restarted. Unused properties are not evaluated, and may safely reference variables that are not provided in a particular context. As such, some properties may not be able to be evaluated within in a given context, but those properties that are evaluated may be used without requiring evaluation of properties that are not evaluated. Further, these values may be changed dynamically without restarting the application.

Context may be provided, for example, by use of configuration objects for applications. The configuration objects may store information, including what properties a given application may provide within a system and what properties are to be provided to the application by other components within the system. A property file may also be used for each application/component to define what a given component may provide and what properties in context a given component needs to be provided by other components within the system. The property file(s) may be instantiated into configuration objects. The configuration objects may be provided as context objects to one or more other application configuration objects, thereby providing a dynamically reconfigurable entity that is separate from the applications themselves and that may be reconfigured on demand (e.g., dynamically as needed). Dynamic properties are not evaluated until certain points in time during runtime (e.g., after a relationship is instantiated or changed). Relationships may be instantiated between components in an organized manner for any given property (e.g., self, provider, consumer , etc.) As such, by changing one or more values associated with one or more configuration objects, or the configuration objects themselves, context may be changed for one or more applications without requiring the application(s) to be restarted.

The properties may be read in as names and definitions. The definitions may be scanned, using a parsing process, such as Java® parsing, to identify any variables referenced in the expressions and any dependencies between properties. These definitions may be stored with any identified dependencies marked for conditional evaluation within one or more contexts over time. A single evaluation environment (the programmatic equivalent of a shell) may be created to evaluate the property expressions, such as BeanShell, and though it is understood that any scripting language may be used, Bean-Shell may be suitable for use with Java® implementations.

When a property is evaluated, its prerequisite properties are evaluated first (in dependency order). The result of each evaluation is also defined as a variable with the respective property name in the evaluation environment. If that property or any of its prerequisites rely on (e.g., reference) a variable that has not been provided within a given context, an error message may be issued or a prompt generated, and in such a situation, the appropriate context for a given implementation may be supplied. Each piece of context may be stored as a variable within the evaluation environment. These stored variables may then be used in expressions in the definition of other context-based properties, again in an on-demand manner as referenced within a given context.

As one possible example, the following example pseudo code identifies context-based properties as described herein.

PropertyA="Hello"
PropertyB=PropertyA+", World."
PropertyC=self.getName( )
PropertyD=PropertyA+","+PropertyC A dependency analysis of this example pseudo code reveals the following relationships: PropertyA depends on nothing else; PropertyB depends on the known PropertyA; PropertyC depends on the (unknown) variable "self"; and PropertyD depends upon the on-demand evaluated PropertyC. On being asked to evaluate or expand PropertyB within context, the present subject matter will first evaluate PropertyA and cache the result, as well as populate the evaluation environment with a variable called PropertyA. PropertyB will then be evaluated since PropertyA is already defined as a variable in the evaluation environment and the result will be cached with a variable called PropertyB populated within the evaluation environment. Evaluation or expansion of PropertyC within a given context may be delayed and evaluated on demand if a context object has not yet been provided for the "self" variable and PropertyC will not be expanded until such a context object has been provided for the "self" variable. Evaluation or expansion of PropertyD within a given context may also be delayed and evaluated on demand because PropertyD depends upon the on-demand evaluated PropertyC. As one additional observation associated with the present example, evaluation of the PropertyC may also be delayed if a context object is provided for the "self" variable that does not have a method titled "getName( )." If the "self" object is replaced, and either of the PropertyC or the PropertyD values is requested, these properties will be evaluated using the new context.

It should be noted that in addition to delaying expansion of values in context, the present subject matter provides for provision of new contexts over time without requiring an application to be restarted. In such an implementation, evaluated properties from one context may be discarded or may be saved as a context map. A new context may then be provided before the variables are evaluated again. Dynamic properties may be evaluated at each change of context. In this manner, the property definitions are treated as a set of templates, and the required values may be determined within a particular context, and re-determined whenever that context is replaced.

Accordingly, based upon the present subject matter, if a configuration value is compute-intensive or needs to be retrieved interactively, that value may be computed once and re-used across contexts unless the value(s) it depends upon have changed. Additionally, the dependency relationships between properties may be determined automatically by analysis of the computable expressions. This analysis and re-evaluation of properties may be performed in response to context changes associated with applications and application resources.

The evaluation environment may be implemented as a context tracking device or system that monitors application context changes associated with a monitored system associated with instantiated applications. In response to each application context change, relationship context dependency properties between the instantiated applications and application resources associated with the instantiated applications may be evaluated. The relationship context dependency properties define dynamic runtime-assignable information (e.g., associations, values, etc.) associated with inter-relationships between the instantiated applications and application associations with the application resources. A determination may be made as to whether at least one relationship context dependency property has changed as a result of an application context change and the at least one relationship context dependency property may be updated during runtime based upon currently instantiated applications and application resources that provide the current context.

Dynamic context-based properties may be partitioned into multiple contexts for a given application or system. For example, some properties may be static properties that are defined and evaluated upon instantiation of an application, while other properties may be dynamic properties (e.g., properties that depend upon context). Further, dynamic context-based properties may be partitioned and associated with more than one context/configuration object. The dynamic context-based properties may be tracked and evaluated at each context change. As such, in response to a context change, a determination may be made as to whether a property is already evaluated (e.g., static). If a property is a static property and already evaluated, then its associated value may be retrieved. If the property is a dynamic context-based property, it may be evaluated in response to each change in context. Further, where dynamic context-based properties are partitioned among multiple context/configuration objects, tracking may be performed to identify which properties are changed for any given context change and only dynamic context-based properties that have changed as a result of a given context change may be re-evaluated. Such an implementation may improve evaluation time for a given context change.

A unit of consideration for the delayed expansion of values in context described herein may be viewed as a "relationship" between two components. For example, a web-based application that uses a database is an example of a relationship. A flag may be maintained within a context structure or other storage arrangement in memory to identify changed properties when context changes, and to indicate that the respective properties are to be reevaluated. The delayed expansion of values in context tracks dependencies and repopulates context in response to context changes. As such, where it is determined that a property, such as "self," has a different value from a last evaluation, the value may be considered "dirty" and may be reevaluated.

To implement the tracking and monitoring of context, a context monitoring component or environment may evaluate instantiated applications/components and read in properties associated with these elements. A context structure may be created in memory with some properties expanded (e.g., static properties or dynamic properties with context at the time of evaluation), and other properties may be defined, but not yet expanded. Dependency information between certain properties may also be stored in such a structure. An indication of any context objects may also be stored within such a context structure. State information for context may also be stored in association with a context structure.

As such, the context structure may be evaluated and state information may be compared to determine whether any associated context objects have changed when an evaluation request is detected. If any portion of the context structure has changed, the changed values within the context structure may be reevaluated. If no change has resulted from a context change, a cached value of a given property variable may be used. Dynamic context-based properties may be cached, but may change later. Storage of properties may include a built-in facility for saving current property values (e.g., as a property map). As such, caching the computed dynamic context-based property values allows the computed value to persist across context changes where a given context change does not result in a value change for a given property.

As such, the delayed expansion of values in context described herein introduces the use of context objects, such as illustrated in PropertyC in the example above. Evaluated properties from one context may be discarded or saved as within a property map (e.g., a context structure). If one or more contexts change, only the affected values will be re-evaluated. Values are computed only when required, and re-computed only when the values they depend upon have changed. Properties are evaluated within a supplied context and this context may change over time. As such, the delayed expansion of values in context allows objects at runtime to be referenced for context and for the computed values dependent on any context to be re-computed when used if the context associated with the values has changed.

The delayed expansion of values in context described herein may be performed in real time to allow prompt re-evaluation of relationships and context for one or more applications and one or more application resources. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
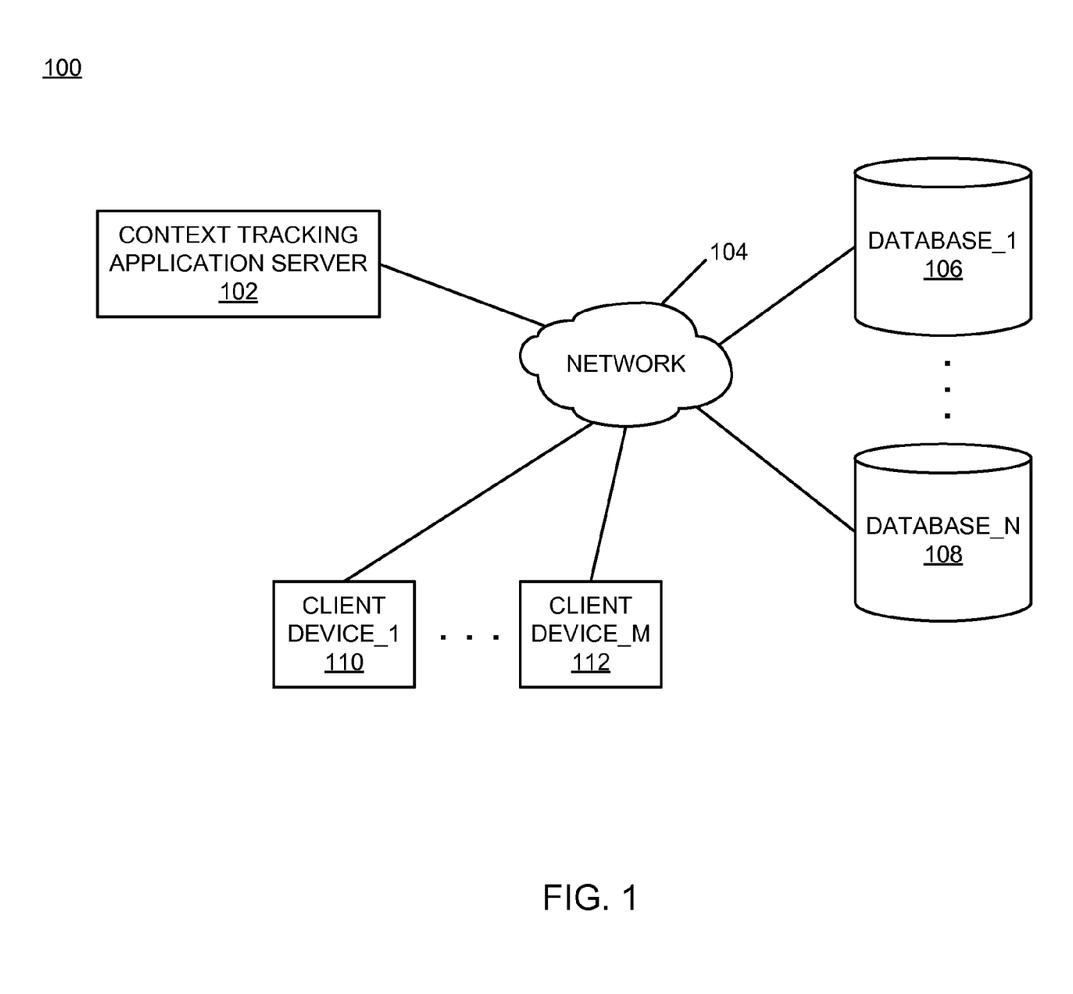
FIG. 1 is a block diagram of an example of an implementation of a system for automated delayed expansion of values in context according to an embodiment of the present subject matter.

FIG. 1 is a block diagram of an example of an implementation of a system 100 for automated delayed expansion of values in context. A context tracking application server 102 communicates via a network 104 to access a database_1 106 through a database_N 108. The context tracking application server 102 provides server-based application support for database transactions for a client device_1 110 through a client device_M 112. It should be understood that the present example and the examples that follow utilize a database-oriented system for purposes of description and that the present subject matter is not limited to either application server environments or database application environments. The present subject matter may be utilized in any system/ environment where components may be chosen dynamically and each component has a set of properties that may be used to configure its respective behavior and interactions as context for other components. As such, the present subject matter may be utilized within any system as appropriate for a given implementation.

As will be described in more detail below in association with FIG. 2 through FIG. 5, the context tracking application server 102 provides automated processing of context for relationships between applications and application resources. As such, it is understood that the context tracking application server 102 may support multiple applications and that the database_1 106 through the database_N 108 represent application resources for purposes of the examples described herein. Additionally, as described above and in more detail below, the context tracking application server 102 may monitor and track application context changes associated with instantiated applications. The application context changes may include application instantiation changes and application resource changes. Relationship context dependency properties between the instantiated applications and application resources associated with the instantiated applications may be evaluated. The relationship context dependency properties may define dynamic runtime-assignable information associated with inter-relationships between the instantiated applications and application associations with the application resources. The dynamic relationship context dependency properties may be updated on demand during runtime based upon the application context change. The automated delayed expansion of values in context is based upon these application context changes and relationship context dependency properties between applications and application resources. The automated delayed expansion of values in context may be implemented by a device, such as the context tracking application server 102, as appropriate for a given implementation.

It should be noted that the context tracking application server 102 may be a portable computing device, either by a user's ability to move the context tracking application server 102 to different locations, or by the context tracking application server 102's association with a portable platform, such as a plane, train, automobile, or other moving vehicle. It should also be noted that the context tracking application server 102 may be any computing device capable of processing information as described above and in more detail below. For example, the context tracking application server 102 may include devices such as a personal computer (e.g., desktop, laptop, etc.), or any other server-based device capable of processing information as described in more detail below. Additionally, the automated delayed expansion of values in context may be implemented by other forms of user devices, such as handheld devices (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database_1 106 through the database_N 108 may include any device capable of storing and providing data for consumption by a device, such as the context tracking application server 102 as served to the client device_1 110 through the client device_M 112, via a network, such as the network 104. Further, the database_1 106 through the database_N 108 may each include a relational, object oriented, or other type of database without departure from the scope of the present subject matter.

Figure 2:
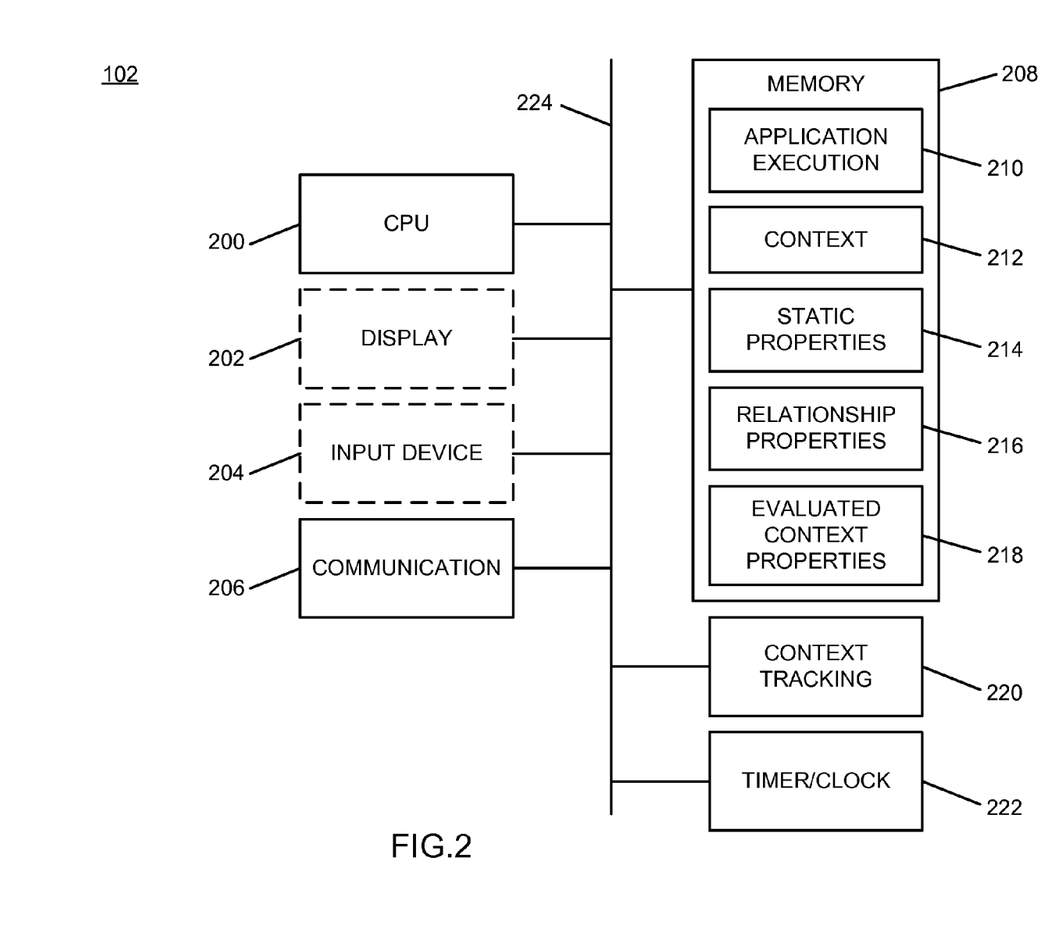
FIG. 2 is a block diagram of an example of an implementation of a context tracking application server capable of performing automated delayed expansion of values in context according to an embodiment of the present subject matter.

FIG. 2 is a block diagram of an example of an implementation of the context tracking application server 102 capable of performing the automated delayed expansion of values in context. A central processing unit (CPU) 200 provides computer instruction execution, computation, and other capabilities within the context tracking application server 102. A display 202 provides visual information to a user of the context tracking application server 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the context tracking application server 102 for certain implementations. Accordingly, the context tracking application server 102 may operate as a completely automated embedded device without user configurability or feedback. However, the context tracking application server 102 may also provide user feedback and configurability via the display 202 and the input device 204, respectively.

A communication module 206 provides interconnection capabilities that allow the context tracking application server 102 to communicate with other modules within the system 100, such as the database_1 106 through the database_N 108, and the client device_1 110 through the client device_M 112, to perform the delayed expansion of values in context described herein. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes an application execution area 210 that provides execution space for one or more applications. It should be noted that application storage space is omitted from the present example for brevity. A context storage area 212 may store context information, such as configuration objects for applications that are hosted by the context tracking application server 102. As described in association with the example of FIG. 3 below, a configuration object associated with one application may operate within a dual role of being a configuration object for the application with which it is associated and by providing context for another application. As such, these configuration/context objects may be stored within a storage area such as the context storage area 212.

A static properties storage area 214 may store static properties and derived static properties, such as the PropertyA and the PropertyB described above, respectively. A relationship properties storage area 216 may store relationship information, such as identifiers and variables of information derived from context, such as via configuration/context objects, that indicates interrelationships between applications and/or application resources. An evaluated context properties storage area 218 may store information associated with evaluation of contextual changes, such as context structure flags, indicators, or other information used to monitor and track contextual changes for instantiated applications.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, an operating system storage area, a code execution area, and a data area without departure from the scope of the present subject matter.

A context tracking module 220 is also illustrated. The context tracking module 220 provides monitoring, tracking, and evaluation processing capabilities for the context tracking application server 102, as described above and in more detail below. The context tracking module 220 implements the automated delayed expansion of values in context of the context tracking application server 102.

Though the context tracking module 220 is illustrated as a component-level module for ease of illustration and description purposes, it should be noted that the context tracking module 220 may include any hardware, programmed processor(s), and memory used to carry out the functions of this module as described above and in more detail below. For example, the context tracking module 220 may include additional controller circuitry in the form of application specific integrated circuits (ASICs), processors, and/or discrete integrated circuits and components for performing communication and electrical control activities associated with the respective devices. Additionally, the context tracking module 220 may include interrupt-level, stack-level, and application-level modules as appropriate. Furthermore, the context tracking module 220 may include any memory components used for storage, execution, and data processing for performing processing activities associated with the module.

It should also be noted that the context tracking module 220 may form a portion of other circuitry described without departure from the scope of the present subject matter. Further, the context tracking module 220 may alternatively be implemented as an application stored within the memory 208. In such an implementation, the context tracking module 220 may include instructions executed by the CPU 200 for performing the functionality described herein. The CPU 200 may execute these instructions to provide the processing capabilities described above and in more detail below for the context tracking application server 102. The context tracking module 220 may form a portion of an interrupt service routine (ISR), a portion of an operating system, a portion of a browser application, or a portion of a separate application without departure from the scope of the present subject matter.

A timer/clock module 222 is illustrated and used to determine timing and date information, such as for periodic or other interval-based monitoring and tracking of context changes associated with instantiated applications, as described above and in more detail below. As such, the context tracking module 220 may utilize information derived from the timer/clock module 222 for information processing activities, such as the delayed expansion of values in context described herein.

The CPU 200, the display 202, the input device 204, the communication module 206, the memory 208, the context tracking module 220, and the timer/clock module 222 are interconnected via an interconnection 224. The interconnection 224 may include a system bus, a network, or any other interconnection capable of providing the respective components with suitable interconnection for the respective purpose.

While the context tracking application server 102 is illustrated with and has certain components described, other modules and components may be associated with the context tracking application server 102 without departure from the scope of the present subject matter. Additionally, it should be noted that, while the context tracking application server 102 is described as a single device for ease of illustration purposes, the components within the context tracking application server 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the context tracking application server 102 are possible and all are considered within the scope of the present subject matter. Accordingly, the context tracking application server 102 may take many forms and may be associated with many platforms.

Figure 3:
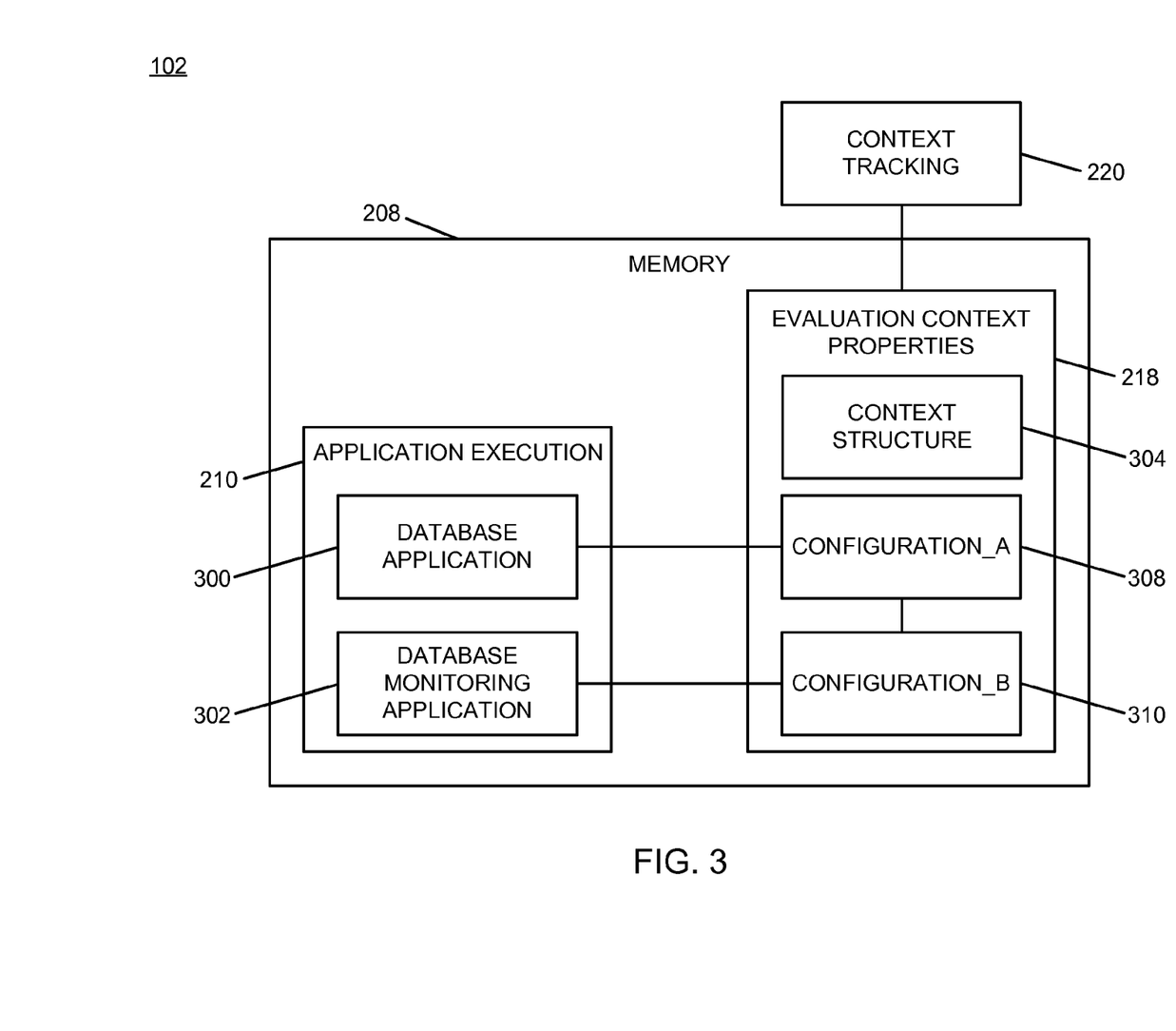
FIG. 3 is a logical block diagram of an example of an implementation of portions of a context tracking application server with multiple instantiated applications executing, where each instantiated application has an associated configuration object that provides for and acts as a context object for another instantiated application according to an embodiment of the present subject matter.

FIG. 3 is a logical block diagram of an example of an implementation of portions of the context tracking application server 102 with multiple instantiated applications executing, where each instantiated application has an associated configuration object that provides for and acts as a context object for another instantiated application. As can be seen within FIG. 3, the application execution area 210 includes a database application 300 and a database monitoring application 302. The evaluated context properties storage area 218 includes a context structure 304 that is utilized by the context tracking module 220 to monitor application context changes associated with instantiated applications, such as the database application 300 and the database monitoring application 302. The context structure 304 may be formatted as appropriate for a given implementation and it is understood that many possible formats exist for such a structure. As such, any context structure format that provides for the information described herein may be used. The context structure 304 may include information derived from contextual relationships between instantiated applications.

Within the example of FIG. 3, a configuration_A object 308 provides configuration information for the database application 300. Similarly, a configuration_B object 310 provides configuration information for the database monitoring application 302. For purposes of the present example, the configuration_A object 308 and the configuration _B object 310 also provide relationship context information that is based upon the associations (e.g., context) with which the respective elements are interconnected and operating. The relationship context information may include information provided by the respective configuration object that may be utilized and associated with other applications. The relationship context information may also define information that specifies what a given application needs in the form of relationship binding or other contextual information. As such, the configuration_A object 308 and the configuration_B object 310 provide a public interface that defines what its associated application provides and what its associated application needs in the form of relationship context-based information. Accordingly, the respective configuration objects may fulfill the dual role of providing configuration information for the respective application with which they are associated and may also operate as a context object for another application's configuration object.

Within the present example, the database application 300 is assumed to utilize a database, such as one of the database_1 106 through the database_N 108. It is also assumed that the database monitoring application 302 monitors the database that is utilized by the database application 300. Accordingly, the configuration_B object 310 may refer to a database name provided by the configuration_A object 308 via the public interface of the configuration_A object 308. For purposes of the present example, the database name may be considered context or context-based information for the database application 300 as part of its configuration and thereby defines a relationship between the respective components. The database name may also be considered context for the database monitoring application 302 by virtue of the configuration _A object 308 providing that database name as context to the configuration_B object 310 for use by the database monitoring application 302. As such, when the database monitoring application 302 is deployed to work with the database application 300, the database name may be looked up between the respective configuration objects without either application or the application server code associated with the context tracking application server 102 needing to be changed.

Additionally, based upon the present subject matter, the database application 300 may be reconfigured during runtime to utilize a different one of the database_1 106 through the database_N 108. Within the present example, such a change may be considered a change of context (e.g., relationship) associated with the database application 300. As such, this database change associated with the database application 300 may be considered a context change. The configuration_A object 308 may be updated via the context tracking module 220 to change the database information, such as the database name, Internet protocol (IP) address, or other information. In response to such a change to the configuration_A object 308, the new database name may be propagated to the configuration_B object 310 via the public interface of the configuration_A object 308. The context structure 304 may be updated with this updated configuration and context information for context tracking purposes.

As such, relationship context dependency properties based upon currently instantiated applications and application resources may be updated during runtime. As applications are instantiated or removed from execution within the application execution area 210, the context structure 304 may be updated to reflect the addition or the removal of the respective instantiated applications. Further, relationship context dependency properties may be added to the context structure 304 for any application or resource that is instantiated, and may be removed for any application or resource that is no longer used. As such, relationship context dependency variable values may be redefined within the context structure 304 using relationship context dependency properties within the respective configuration objects operating as context objects for other applications without restarting currently instantiated applications. Many variations on the present subject matter are possible and all are considered to be within the scope of the present subject matter.

Figure 4:
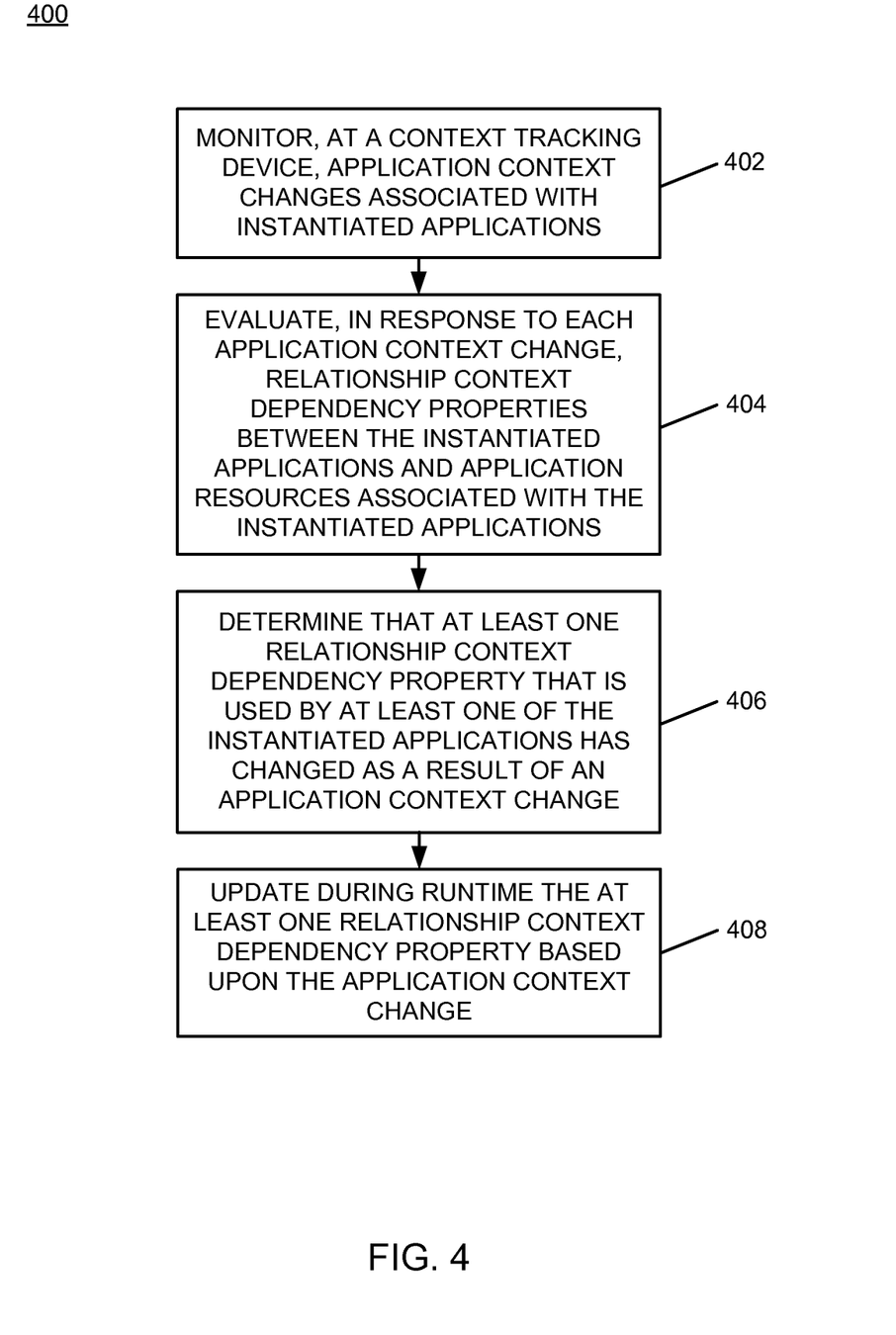
FIG. 4 is a flow chart of an example of an implementation of a process for automated delayed expansion of values in context according to an embodiment of the present subject matter.
Figure 5:
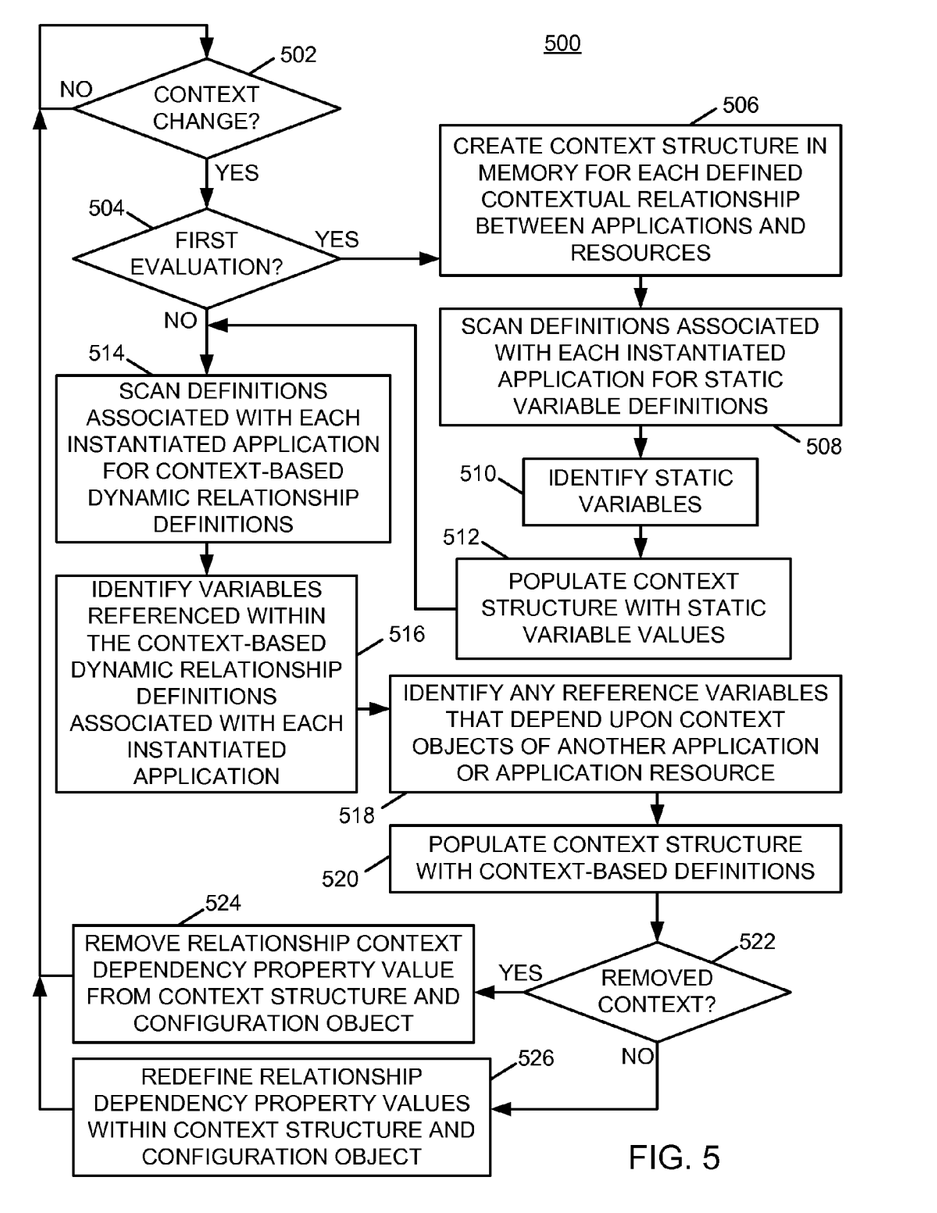
FIG. 5 is a flow chart of an example of an implementation of a process for delayed expansion of values in context to populate dynamic context-based relationship variables as context changes over time for one or more instantiated applications according to an embodiment of the present subject matter.

FIG. 4 through FIG. 5 below describe example processes that may be executed by devices, such as the context tracking application server 102, to perform the automated delayed expansion of values in context associated with the present subject matter. Many other variations on the example processes are possible and all are considered within the scope of the present subject matter. The example processes may be performed by modules, such as the context tracking module 220 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated delayed expansion of values in context. At block 402, the process 400 monitors, at a context tracking device, application context changes associated with instantiated applications. At block 404, the process 400 evaluates, in response to each application context change, relationship context dependency properties between the instantiated applications and application resources associated with the instantiated applications. At block 406, the process 400 determines that at least one relationship context dependency property that is used by at least one of the instantiated applications has changed as a result of an application context change. At block 408, the process 400 updates during runtime the at least one relationship context dependency property based upon the application context change.

FIG. 5 is a flow chart of an example of an implementation of a process 500 for delayed expansion of values in context to populate dynamic context-based relationship variables as context changes over time for one or more instantiated applications. At decision point 502, the process 500 makes a determination as to whether a context change associated with any instantiated application has occurred. For purposes of the present example, it is understood that a context change may also include an initial startup of a system and instantiation of a first of one or more applications associated with a device, such as the context tracking application server 102 or other device. In response to determining that a context change has been detected at decision point 502, the process 500 makes a determination as to whether the detected context change represents a first evaluation of context for one or more instantiated applications at decision point 504. It is understood for purposes of the present example, that instantiated applications may have static values, such as the propertyA described above, and derived static values, such as the propertyB, also described above. As such, in response to determining that the detected context change is a first evaluation, the process 500 creates (or updates for subsequent iterations and application instantiations) a context structure, such as the context structure 304, in memory to store relationship information for each defined contextual relationship between the instantiated applications and resources at block 506. It is understood that the context structure may include entries for context-based relationship property values and that these context-based relationship property values may be populated as context is provided for the respective values during runtime if they are unavailable at the time of instantiation of the respective application. At block 508, the process 500 scans definitions associated with each instantiated application for static variable definitions. At block 510, the process 500 identifies static variables. At block 512, the process 500 populates the context structure with static variable values provided within static or derivable static properties associated with the respective instantiated application.

It should be noted that dynamic context-based definitions may be defined within the context structure and populated, as described in more detail below, where context is available. Alternatively, where context is not available during a given iteration of the process 500, the process 500 provides for delaying evaluation of relationship context dependency properties that are without an associated context object currently usable to evaluate the respective relationship context dependency property within a current application context.

Returning to the description of FIG. 5, in response to populating the context structure with static variable values at block 512, or in response to determining that the detected context change is not a first evaluation for a given instantiated application at decision point 504, the process 500 scans definitions associated with each instantiated application for context-based dynamic relationship definitions at block 514. It should be understood that this evaluation may be performed in association with each context change associated with an instantiated application and for each instantiation change (e.g., addition or removal of an application or application resource). At block 516, the process 500 identifies variables referenced within the context-based dynamic relationship definitions associated with each instantiated application. At block 518, the process 500 identifies any referenced variables that depend upon context objects of at least one of another instantiated application or application resource. At block 520, the process 500 populates the context structure with any identified and defined context-based dynamic relationship definitions. It is understood that certain of the defined context-based dynamic relationship definitions may be evaluated within a current context and that certain of the defined context-based dynamic relationship definitions may be evaluated in response to a subsequent context change.

As described above, a context change may result in the addition or removal of context values. As such, at decision point 522, the process 500 makes a determination as to whether the detected context change has resulted in either removed context information, or alternatively one of new/added context information or changed context information. In response to determining that the detected context change has resulted in a removal of context information, the process 500 removes one or more relationship context dependency property values from the context structure at block 524. A property configuration object associated with an instantiated application may also be updated or removed as appropriate for a given implementation at block 524. In response to determining that the detected context change has resulted in either new/added context information or changed context information at decision point 522, the process 500 redefines one or more relationship context dependency property values within the context structure at block 526. The process 500 may also update a property configuration object associated with the instantiated application for which the context change was detected at block 526. In response to completion of the processing at block 524 or at block 526, the process 500 returns to decision point 502 to make a determination as to whether an additional context change has been detected.

As such, the process 500 may iteratively process context changes during runtime associated with instantiated applications. Further, the process 500 may define static variable values and dynamic relationship context dependency definitions for each instantiated application as those applications are instantiated, and may process context changes associated with instantiated applications and application resources. As described above, application context changes may include application instantiation changes and application resource changes. Relationship context dependency properties may define dynamic runtime-assignable information associated with inter-relationships between the instantiated applications and the application associations with application resources. The process 500 evaluates, in response to each application context change, context objects associated with each instantiated application, where each context object represents a configuration object for another instantiated application. References to resources associated with an instantiated application may be updated without restarting the instantiated application. Property configuration objects associated with instantiated applications may be updated, again without restarting the instantiated application.

As described above in association with FIG. 1 through FIG. 5, the example systems and processes provide delayed expansion of values in context. Many other variations and additional activities associated with delayed expansion of values in context are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   monitoring, at a context tracking device, application context changes comprising runtime changes to values of referenced application definitions associated with instantiated applications, where the referenced application definitions represent application context dependencies for the instantiated applications;
   evaluating, in response to each of a plurality of application context changes to the values of the referenced application definitions, relationship context dependency properties that define dynamic runtime-assignable information comprising inter-relationships between the instantiated applications and application associations with application resources used by the instantiated applications, comprising:
      evaluating a context object associated with each instantiated application, where each context object comprises a configuration object of another instantiated application;
      scanning the referenced application definitions associated with each instantiated application for context-based dynamic relationship definitions;
      identifying variables referenced within the context-based dynamic relationship definitions associated with each instantiated application; and
      identifying any referenced variables that depend upon context objects of at least one other instantiated application;
   determining that at least one relationship context dependency property that is used by at least one of the instantiated applications has changed as a result of an application context change; and
   updating during runtime the at least one relationship context dependency property based upon the application context change, where the at least one of the instantiated applications continues execution using the updated at least one relationship context dependency property.

2. The method of claim 1, where the plurality of application context changes comprise application instantiation changes and application resource changes.

3. The method of claim 1, where updating during runtime the at least one relationship context dependency property based upon the application context change comprises updating a reference to an application resource within a property configuration object associated with the at least one instantiated application without restarting the at least one instantiated application.

4. The method of claim 1, where updating during runtime the at least one relationship context dependency property based upon the application context change comprises redefining at least one relationship context dependency variable value within a context structure associated with the at least one relationship context dependency property without restarting the at least one instantiated application.

5. The method of claim 1, further comprising delaying, in response to instantiation of an application, evaluation of at least one relationship context dependency property without an associated context object within a current application context that is useable to evaluate the relationship context dependency properties.

6. A system, comprising:
a memory; and
a processor programmed to:
monitor application context changes comprising runtime changes to values of referenced application definitions associated with instantiated applications, where the referenced application definitions represent application context dependencies for the instantiated applications;
evaluate, in response to each of a plurality of application context changes to the values of the referenced application definitions, relationship context dependency properties that define dynamic runtime-assignable information comprising inter-relationships between the instantiated applications and application associations with application resources used by the instantiated applications, where the processor is programmed to:
evaluate a context object associated with each instantiated application, where each context object comprises a configuration object of another instantiated application;
scan the referenced application definitions associated with each instantiated application for context-based dynamic relationship definitions;
identify variables referenced within the context-based dynamic relationship definitions associated with each instantiated application; and
identify any referenced variables that depend upon context objects of at least one other instantiated application;
determine that at least one relationship context dependency property that is used by at least one of the instantiated applications has changed as a result of an application context change; and
update during runtime the at least one relationship context dependency property based upon the application context change, where the at least one of the instantiated applications continues execution using the updated at least one relationship context dependency property.

7. The system of claim 6, where the plurality of application context changes comprise application instantiation changes and application resource changes.

8. The system of claim 6, where in being programmed to update during runtime the at least one relationship context dependency property based upon the application context change, the processor is programmed to update a reference to an application resource within a property configuration object associated with the at least one instantiated application without restarting the at least one instantiated application.

9. The system of claim 6, where in being programmed to update during runtime the at least one relationship context dependency property based upon the application context change, the processor is programmed to re-define at least one relationship context dependency variable value within a context structure associated with the at least one relationship context dependency property without restarting the at least one instantiated application.

10. The system of claim 6, where the processor is further programmed to delay, in response to instantiation of an application, evaluation of at least one relationship context dependency property without an associated context object within a current application context that is useable to evaluate the relationship context dependency properties.

11. A computer program product comprising a computer readable storage medium including computer readable program code, where the computer readable program code when executed on a computer causes the computer to:
monitor application context changes comprising runtime changes to values of referenced application definitions associated with instantiated applications, where the referenced application definitions represent application context dependencies for the instantiated applications;
evaluate, in response to each of a plurality of application context changes to the values of the referenced application definitions, relationship context dependency properties that define dynamic runtime-assignable information comprising inter-relationships between the instantiated applications and application associations with application resources used by the instantiated applications, where the computer readable program code when executed on the computer causes the computer to:
evaluate a context object associated with each instantiated application, where each context object comprises a configuration object of another instantiated application;
scan the referenced application definitions associated with each instantiated application for context-based dynamic relationship definitions;
identify variables referenced within the context-based dynamic relationship definitions associated with each instantiated application; and
identify any referenced variables that depend upon context objects of at least one other instantiated application;
determine that at least one relationship context dependency property that is used by at least one of the instantiated applications has changed as a result of an application context change; and
update during runtime the at least one relationship context dependency property based upon the application context change, where the at least one of the instantiated applications continues execution using the updated at least one relationship context dependency property.

12. The computer program product of claim 11, where in causing the computer to update during runtime the at least one relationship context dependency property based upon the application context change, the computer readable program code when executed on the computer causes the computer to update a reference to an application resource within a property configuration object associated with the at least one instantiated application without restarting the at least one instantiated application.

13. The computer program product of claim 11, where in causing the computer to update during runtime the at least one relationship context dependency property based upon the application context change, the computer readable program code when executed on the computer causes the computer to re-define at least one relationship context dependency variable value within a context structure associated with the at least one relationship context dependency property without restarting the at least one instantiated application.

14. The computer program product of claim 11, where the computer readable program code when executed on the computer further causes the computer to delay, in response to instantiation of an application, evaluation of at least one relationship context dependency property without an associated context object within a current application context that is useable to evaluate the relationship context dependency properties.

\* \* \* \* \*